a French public establishment
3,107,208
PRODUCTION OF POLYFORMALDEHYDE

Claude Chachaty, Paris, France, assignor to Houillères du Bassin du Nord et du Pas-de-Calais, Douai, France, a French public establishment
No Drawing. Filed Dec. 21, 1960, Ser. No. 77,289
Claims priority, application France Dec. 28, 1959
3 Claims. (Cl. 204—154)

This invention relates to the production of polyformaldehyde, and more particularly to the production of polyformaldehyde by subjecting formaldehyde, in the absence of a catalyst, to ionizing radiation at a temperature below −60° C.

I have found that at temperatures below −60° C., a whole series of temperature zones can be distinguished in which the conditions most favourable for polymerization by irradiation differ substantially.

In the first place, −118° C. is the melting point of formaldehyde monomer so that above this temperature the reaction takes place in the liquid phase, whereas below this temperature it is effected in the solid phase.

At temperatures above −118° C., but below −60° C., the temperature range of from −118° C. to −80° C. is preferably used, because above −80° C. the spontaneous thermal polymerization of formaldehyde is too abrupt and the reaction cannot be effectively controlled. In the range of −118° C. to −80° C., this spontaneous thermal polymerization is relatively slight although it is detectable.

According to one feature of the present invention, therefore, the irradiation polymerization of formaldehyde is carried out at a temperature of from −118° C. to −80° C., the formaldehyde monomer being in the liquid form.

In this case a polyformaldehyde is formed which is translucent and compact. It is somewhat difficult to eliminate the residual monomer from this polymer so that it is often advantageous to dilute the liquid formaldehyde monomer with an inert, non-polymerizable, liquid diluent, such as a hydrocarbon or an organic oxide for example hexane or diethyl ether, at the rate, for example, of from 50% to 80% by weight, the polymer then being obtained in powdered form.

At temperatures below −118° C., it has been found that there is a relatively narrow temperature zone, in the region of −160° C., on each side of which the reaction takes place with a distinctly different character.

Thus, between about −160° C. and −118° C., irradiation of the solid monomer gives rise to a polymer which, on being heated, does not appear to undergo any polymer chain growth, that is formation of the polymer is substantially or wholly completed during irradiation.

According to another feature of the invention, therefore, solid formaldehyde monomer is subjected to ionizing radiation, in the absence of any diluent, at a temperature of from about −160° C. to about −118° C.

On the other hand, below about −160° C., that is to say approximately between −196° C. and −160° C., the irradiated monomer, when it is heated, tends to give rise to an explosive reaction which, it is thought, may be due to the accumulation of active low temperature centers and the abrupt spontaneous polymer chain growth from these active centers on heating.

I have found that it is possible to overcome this disadvantage by effecting irradiation of the monomer at temperatures of from about −196° C. to about −160° C. in the presence of a moderating agent which reduces the extent of heat liberation due to polymer chain growth when the reaction mass is heated to temperatures above −160° C.

Suitable moderating agents are inert, non-polymerizable diluents, such as hydrocarbons, e.g. hexane, and organic oxides, e.g. diethyl ether. It is also possible to use the polymer, that is polyformaldehyde, itself as the moderating agent. When diluents such as the above are used they are preferably present in an amount of from 20 to 50% by weight of the mixture. If the monomer were diluted by more than 50%, the yield of polymer would be undesirably reduced.

When polyformaldehyde is used as the moderating agent it is preferably formed in situ by subjecting formaldehyde monomer to relatively weak ionizing radiation, in the absence of any diluent, at a temperature of from about −196° C. to about −160° C., then heating the reaction mass to about −80° C. so as to permit polymer chain growth from the relatively limited number of active centers formed by the first irradiation, then cooling the reaction mass to a temperature of from −196° C. to −160° C., and again subjecting it to irradiation, the polymer previously formed then acting as the moderating agent.

According to a still further feature of the invention, therefore, polyformaldehyde is formed by subjecting formaldehyde monomer to ionizing radiation, in the absence of any diluent, at a temperature of from −196° C. to −160° C., the total radiation dose being not more than 300 roentgens, heating the reaction mass to −80° C., then cooling the reaction mass to a temperature from −196° C. to −160° C., and subjecting it to further ionizing radiation, the total radiation dose being at least 100 roentgens, and preferably at least 500 roentgens. Advantageously the latter steps of heating the reaction mass, cooling the reaction mass, and subjecting the cooled reaction mass to further irradiation are repeated until the desired yield of polymer is obtained.

The processes in which a moderating agent is employed are interesting, but the preferred method according to the invention is that which involves irradiation in the absence of any diluent at a temperature of from −160° C. to 118° C. In this case, the preferred conditions of irradiation are a radiation dose of the order of 1000 roentgens at a temperature of about −130° C.

Nevertheless, the temperatures referred to above in connection with formaldehyde polymerization phenomena are relatively approximate because the phenomena to which reference has been made develop fairly progressively with the temperature so that the temperature limits indicated should each be regarded as estimated to approximately plus or minus 5° C.

In order that the invention may be more fully understood, the following examples are given by way of illustration only:

Example 1

Liquid formaldehyde monomer was subjected to varying doses of radiation at a temperature of about −80° C. in the absence of a diluent. The irradiation was effected with a source of cobalt 60 having an intensity of 13 roentgens a minute.

In a first experiment, the period of irradiation was 30 minutes, that is to say the total dose was 400 roentgens.

In a second experiment, the period of irradiation was 60 minutes, that is to say the total dose was 800 roentgens.

Finally, in a third experiment, the period of irradiation was 15 hours 30 minutes, that is to say the total dose was 12,000 roentgens.

In these three experiments, the percentage of polymer formed in relation to the formaldehyde initially present was respectively: 10%, 30% and 100%. The polymer was obtained in the form of a white translucent mass.

When the irradiation was continued up to a total dose of 14,500 roentgens, the yield was 100% and the product obtained had a melting point of 180±1° C. and an intrinsic viscosity of 1.7.

Example 2

The third experiment of Example 1 was repeated, that is to say using a total dose of 12,000 roentgens, but the pure formaldehyde monomer was replaced by a solution containing 50% by weight of formaldehyde monomer and 50% by weight of diethyl ether. A 44% yield of polymer was obtained, the polymer being in granular form.

Example 3

Solid formaldehyde monomer was subjected to varying doses of radiation at a temperature of about −130° C. in the absence of a diluent. The experiments were carried out with the same source and the same intensity as in Example 1. In three successive experiments, the periods of irradiation were respectively: 15, 30 and 45 minutes, corresponding to doses of 200, 400 and 600 roentgens. A yield of 15, 20 and 23% of polymer was obtained respectively in relation to the monomer used.

The polymer thus obtained was formed in the actual course of the irradiation. After elimination of the residual monomer, a fibrous product was obtained consisting of needles of crystalline appearance; this product could be readily broken into fragments.

Example 4

A 30% solution of formaldehyde monomer in diethyl ether was irradiated for one hour by means of a source of cobalt 60 having an intensity of 13 r./minute (that is to say a total dose of 780 roentgens) at −130° C. At this temperature, the solution was liquid. A 15% yield of polymer was obtained.

Example 5

Solid formaldehyde polymer was subjected to irradiation at −196° C. in the absence of any diluent. It was found that with a low intensity radiation, that is with an intensity of the order of 13 roentgens per minute as in the previous example, no apparent polymerization was observed but that, after irradiation, polymerization occurred when the reaction mass was heated, beginning at about −165° C. Thus in a series of experiments with a source having an intensity of 13 roentgens per minute, formaldehyde was subjected to periods of irradiation of: 5, 15, 30, 60, 120 minutes and 10 hours 30 minutes, corresponding to respective doses of 65, 200, 400, 800, 1600 and 8300 roentgens. Yields of 11, 5, 27, 38, 42, 63 and 100% by weight respectively of products having a crystalline appearance and satisfactory physical characteristics were obtained. Thus the product obtained with a dose of 200 roentgens had an intrinsic viscosity of 3.8, while the product obtained with a dose of 8300 roentgens had an intrinsic viscosity of 2.4.

In every case, the product had the same melting point, namely 180±1° C.

On the other hand, with much higher intensities of the order of 1500 roentgens per minute, polymerization was effected in the actual course of the irradiation at −196° C. Thus with such an intensity, a yield of 100% was obtained after 30 minutes of irradiation, that is to say a total dose of 45,000 roentgens. With this level of radiation intensity, the reaction was, however, somewhat violent and difficult to control.

Example 6

A mixture of 37% by weight of diethyl ether and 63% by weight of formaldehyde monomer was irradiated for one hour with a source having an intensity of 13 roentgens per minute at −196° C.; the total dose received was thus 780 roentgens. The yield of polymer obtained was 15.5%.

This example, like Examples 2 and 4 above, shows that the yield of polymer is reduced by nearly a half, other things being equal, by the presence of the diluent. This lower yield may be compensated for by effecting irradiation for longer periods or by using higher intensities of radiation in order to increase the total dose applied.

Example 7

Solid formaldehyde polymer was irradiated with a total dose of about 300 roentgens in the absence of any diluent at a temperature of −196° C. to give a polymer yield of 32%. The reaction mass was heated from −196° C. to −80° C., and was then cooled again to −196° C. and was subjected to a further dose of 400 roentgens to give an additional polymer yield of 8%. In another run the second irradiation was carried out to give a total dose of 870 roentgens which gave an additional polymer yield of 14%.

Successive heating, cooling and irradiation can be repeated until the desired yield of polymer is obtained.

What I claim is:

1. A process for the production of polyformaldehyde which comprises the steps of subjecting formaldehyde monomer to a first dosage of ionising radiation, in the absence of any diluent, at a temperature of from about −196° C. to about −160° C., the total first radiation dose being up to about 300 roentgens, heating the reaction mass to −80° C., cooling the reaction mass to a temperature of from about −196° C. to about −160° C., and subjecting the reaction mass to further ionising radiation, the total further radiation dose being at least 100 roentgens.

2. A process according to claim 1, wherein the total radiation dose for the second irradiation is at least 500 roentgens.

3. A process for the production of polyformaldehyde which comprises the steps of subjecting formaldehyde monomer to a first dosage of ionising radiation, in the absence of any diluent, at a temperature of from about −196° C. to about −160° C., the total first radiation dose being up to about 300 roentgens, heating the reaction mass to −80° C., cooling the reaction mass to a temperature of from about −196° C. to about −160° C., and subjecting the reaction mass to further ionising radiation, the total further radiation dose being at least 100 roentgens, and then repeating the steps of heating the reaction mass, cooling the reaction mass, and subjecting the reaction mass to still further ionising radiation until the desired yield of polymer is obtained.

References Cited in the file of this patent

UNITED STATES PATENTS 2,734,889 Starr _____ Feb. 14, 1956

OTHER REFERENCES

Henglein et al.: Die Makromolekular Chemie, volume 31, pages 181–191 (March 20, 1959).

McLennan et al.: Canadian Journal of Research, volume 5 (1931), pages 470–481.